United States Patent [19]

Nishino et al.

[11] 4,065,406

[45] Dec. 27, 1977

[54] CATALYST FOR USE IN TREATING GAS

[75] Inventors: Atsushi Nishino; Kazunori Sonetaka; Kunio Kimura, all of Neyagawa, Japan

[73] Assignee: Matsushita Electric Industrial Co., Ltd., Japan

[21] Appl. No.: 651,739

[22] Filed: Jan. 23, 1976

[30] Foreign Application Priority Data

Jan. 29, 1975 Japan .................................. 50-12859

[51] Int. Cl.$^2$ .......................... B01J 27/20; B01J 23/76
[52] U.S. Cl. ................................. 252/443; 252/466 J; 423/213.5
[58] Field of Search ............................ 252/466 J, 443

[56] References Cited

U.S. PATENT DOCUMENTS

| 2,419,255 | 4/1947 | Dely | 252/466 J |
|---|---|---|---|
| 3,404,098 | 10/1968 | Stiles | 252/443 |
| 3,445,402 | 5/1969 | Reitmeier | 252/466 J |
| 3,740,349 | 6/1973 | Negra et al. | 252/466 J |
| 3,751,386 | 8/1973 | Koberstein et al. | 252/466 J |
| 3,846,340 | 11/1974 | Okuyama et al. | 252/466 J |
| 3,893,949 | 7/1975 | Sakai et al. | 252/466 J |
| 3,898,183 | 8/1975 | Sugier et al. | 252/466 J |
| 3,905,917 | 9/1975 | Nishino et al. | 252/455 R |
| 3,929,681 | 12/1975 | Buonomo et al. | 252/466 J |

FOREIGN PATENT DOCUMENTS 440,943  1/1936  United Kingdom ................. 252/443

*Primary Examiner*—Patrick P. Garvin
*Assistant Examiner*—William G. Wright
*Attorney, Agent, or Firm*—Burgess, Ryan and Wayne

[57] ABSTRACT

Two types of catalysts are disclosed. They are:

1. Catalyst for oxidation of carbon monoxide, nitrogen monoxide or sulfur dioxide, comprising manganese dioxide, calcium aluminate, iron oxyhydroxide and copper hydroxycarbonate; and 2. Catalyst for oxidation of carbon monoxide, nitrogen monoxide or sulfur dioxide, prepared by heating a mixture of manganese dioxide calcium aluminate, iron oxyhydroxide and copper hydroxycarbonate.

14 Claims, 8 Drawing Figures

CATALYST FOR USE IN TREATING GAS

BACKGROUND OF THE INVENTION

The same inventors as those of the present invention proposed a catalyst for use in purifying exhaust gas, said catalyst comprising manganese dioxide, calcium aluminate and heat resistant aggregate. This catalyst has been disclosed in U.S. Pat. No. 3,905,917. The inventors have found that a catalyst comprising a mixture of manganese dioxide, calcium aluminate, iron oxyhydroxide and copper hydroxycarbonate and a catalyst prepared by heating said mixture are superior to the catalyst disclosed in U.S. Pat. No. 3,905,917 in the catalytic action of oxidation of carbon monoxide, nitrogen monoxide or sulfur dioxide. The present invention is based on this discovery.

SUMMARY OF THE INVENTION

The present invention relates to a catalyst for use in treating gas, and more particularly to a catalyst for the oxidation of carbon monoxide (CO), nitrogen monoxide (NO) or sulphur dioxide ($SO_2$) and process of preparing the catalyst.

The catalysts of the present invention are used for oxidizing CO, NO or $SO_2$ contained in air or oxygen-containing gas to $CO_2$, $NO_2$ or $SO_3$, respectively.

The catalysts of the present invention are as follows:
1. Composition A comprising a mixture of manganese dioxide, calcium aluminate, iron oxyhydroxide and copper hydroxycarbonate.
2. Composition B prepared by heating a mixture of manganese dioxide, calcium aluminate, iron oxyhydroxide and copper hydroxycarbonate at a temperature between 220° C and 850° C for 1 to 5 hours.

The range of the ingredients of Composition A are as follows:

|  | % by weight |
|---|---|
| Manganese dioxide | 45 – 75 |
| Calcium aluminate | 15 – 25 |
| Iron oxyhydroxide | 5 – 15 |
| Copper hydroxycarbonate | 2 – 10 |

Manganese dioxide is preferably $\gamma$-$MnO_2$ having pH values of from 4 to 8.

Calcium aluminate comprises principally $xCaO\cdot Al_2O_3$, and calcium aluminate comprising from 60 to 85% of $Al_2O_3$ and from 40 to 15% of CaO is suitably used. Cements commercially available under the names of Alumina cement or High alumina cement, may be used instead of calcium aluminate as shown above. Calcium aluminate is used as a binder of the catalysts.

Iron oxyhydroxide is FeO(OH).

Copper hydroxycarbonate is $CuCO_3\cdot Cu(OH)_2$ or $2CuCO_3\cdot Cu(OH)_2$.

The catalyst of the present invention are prepared as follows:
1. Composition A is prepared by the steps of:
   a. adding water to a mixture of manganese dioxide, calcium aluminate, iron oxyhydroxide and copper hydroxycarbonate,
   b. forming the mixture into the desired shape,
   c. carrying out preliminarily curing of the shaped body in air, and
   d. accomplishing the curing of the shaped body in the presence of water to solidify the shaped body.
2. Composition B is prepared by heating the solidified body obtained by the steps as shown above, at a temperature between 220° C and 850° C for 1 to 5 hours.

The catalysts of the present invention (Compositions A and B) can be used over a wide temperature range of from 100° C to 850° C to oxidizing CO, NO and $SO_2$ contained in air or oxygen-containing gas to $CO_2$, $NO_2$ and $SO_3$, respectively.

When the catalyst of Composition A is used at temperatures above 220° C, copper hydroxycarbonate changes to CuO, and when the catalyst is used above 275° C, iron oxyhydroxide changes to $\alpha$-$Fe_2O_3$. When the catalysts (Compositions A and B) are heated at temperatures of about 300° C and 600° C, they have the following compositions:

$\beta$-$MnO_2$ - $xCaO\cdot Al_2O_3$ - $\alpha$-$Fe_2O_3$ - CuO (300° C)
$\alpha$-$Mn_2O_3$ - $xCaO\cdot Al_2O_3$ - $\alpha$-$Fe_2O_3$ - CuO (600° C)

When Composition A is used at temperatures above 220° C, the catalyst of Composition A changes to a composition of the catalyst of Composition B prepared by heating previously Composition A.

The catalyst of Composition B can be used also at temperatures of 220° C and below 220° C instead of the catalyst of Composition A.

As stated above, the catalysts of the present invention (Compositions A and B) effectively oxidize CO, NO or $SO_2$ to change CO, NO or $SO_2$ to $CO_2$, $NO_2$ or $SO_3$, respectively, and $SO_3$ is combined with $MnO_x$ ($x = 1$ or $2$) and CaO in the catalysts to produce finally $CaSO_4$. Accordingly, these catalysts are suitably used in treating gas (oxygen-containing gas) containing CO, No or $SO_2$.

The superiority of the catalysts of the present invention will be shown in the examples.

DESCRIPTION OF THE PREFERRED EMBODIMENTS

The present invention is illustrated by the following examples. Unless otherwise set forth, all proportions (%) in this specification are by weight.

EXAMPLE 1

Samples Nos. 1, 2, 3, 4, 5, 6 and 7 were provided, which comprise various weight percentages of the ingredients as shown in Table 1, as follows:

Table 1

| Ingredient (%) | Sample No. | | | | | | |
|---|---|---|---|---|---|---|---|
|  | 1 | 2 | 3 | 4 | 5 | 6 | 7 |
| $\gamma$-$MnO_2$ | 65 | 65 | 65 | 65 | 70 | 75 | 60 |
| Calcium aluminate | 20 | 20 | 20 | 20 | 20 | 20 | 20 |
| Iron oxyhydroxide | 10 | 15 |  |  |  |  |  |
| Copper hydroxycarbonate | 5 |  | 15 |  |  |  |  |
| Ferric oxide |  |  |  | 10 | 10 |  |  |
| Copper oxide |  |  |  | 5 |  | 5 |  |

The ingredients were mixed, and to 100 parts (by weight) of the mixture was added 10 parts of water. Columnar shaped bodies having a size of 5 mm$\phi$ × 5 mm were made of the mixtures. The shaped bodies were dried in air and then subjected to the curing in steam having a temperature of 65° C to 95° C for 1 hour.

65 g of each of the cured shaped bodies was filled in a quartz tube having an inside diameter of 30 mm. A gas including oxygen (15%) and nitrogen (84%), containing 1,500 ppm of carbon monoxide, was passed through the quartz tube at a space velocity of 10,000 hr$^{-1}$. Percentages of oxidation of carbon monoxide are shown in FIG. 1.

Figure 1:
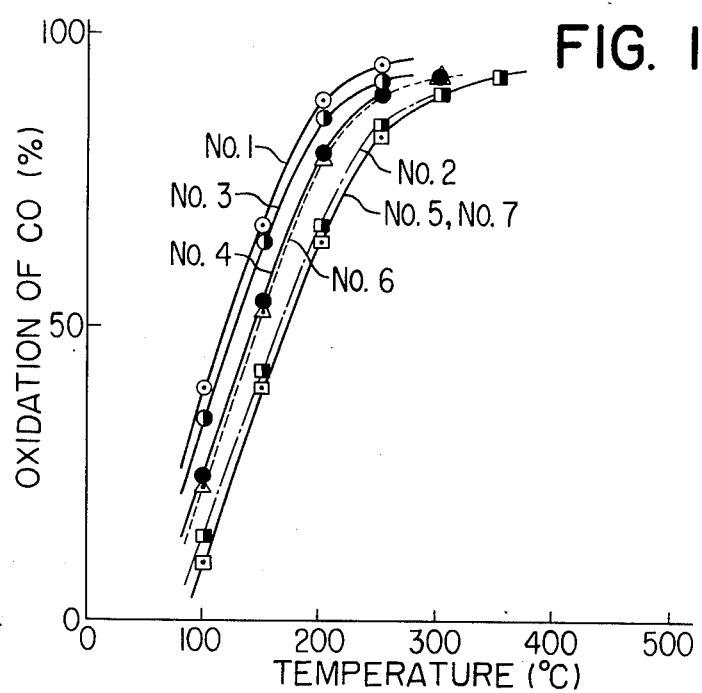

From the results as shown in FIG. 1, it is evident that Sample No. 1 including iron oxyhydroxide and copper hydroxycarbonate is superior to other catalysts (Sample Nos. 2–7) and Sample No. 3 including copper hydroxycarbonate is superior to other catalysts of Sample Nos. 2 and 4–7 in the catalytic action of oxidation of carbon monoxide.

Calcium aluminate in this Example comprises alumina (54%), calcium oxide (38%), ferric oxide and titanium oxide (remainder). Calcium aluminate including 15 to 40% of calcium oxide may be used.

EXAMPLE 2

Sample Nos. 11, 12, 13, 14 and 15 were provided, which comprise various weight percentages of the ingredients as shown in Table 2, by repeating the same procedure as that of Example 1 and then heating the cured shaped bodies at a temperature of 800° C for 4 hours.

Table 2

| Ingredient (%) | Sample No. | | | | |
|---|---|---|---|---|---|
| | 11 | 12 | 13 | 14 | 15 |
| γ-MnO$_2$ | 65 | 65 | 75 | 75 | 80 |
| Calcium aluminate | 20 | 20 | 20 | 20 | 20 |
| Iron oxyhydroxide | 10 | — | — | — | — |
| Copper hydroxycarbonate | 5 | 5 | 5 | — | — |
| Ferric oxide | | 10 | | | |
| Copper oxide | | | | | 5 |

Figure 2:
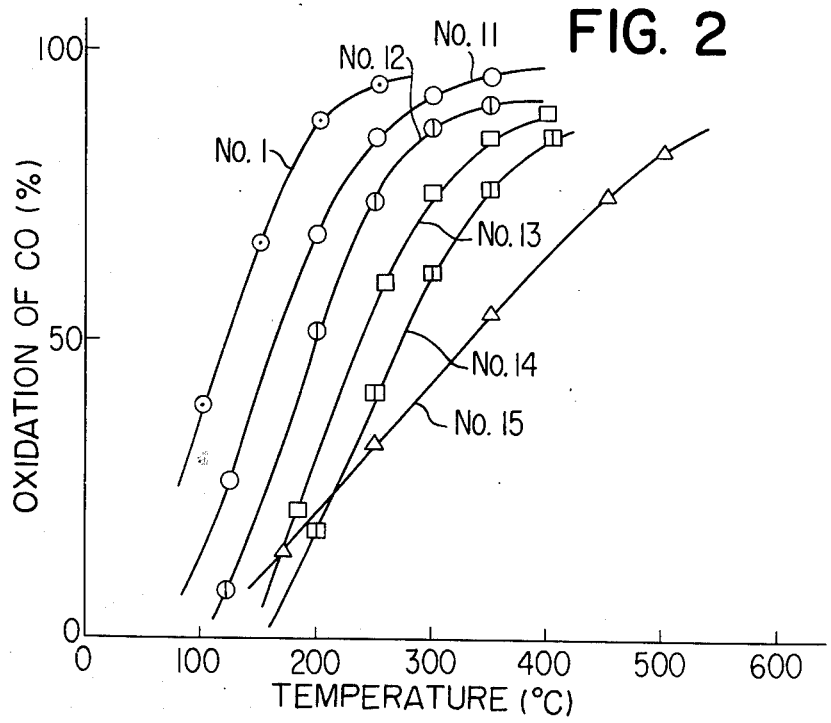

Percentages of oxidation of carbon monoxide were measured in the same manner as that of Example 1. The results obtained are shown in FIG. 2. In FIG. 2, Curve No. 1 of FIG. 1 also is shown with a view to comparing Sample No. 1 (Composition A) with Sample No. 11 (Composition B).

From the results as shown in FIG. 2, it is evident that Sample No. 11 (catalyst of the present invention, Composition B) is superior to other catalysts (Sample Nos. 12, 13, 14 and 15) in the catalytic action of oxidation of carbon monoxide at elevated temperatures and that Sample No. 1 (Composition A) is superior to Sample No. 11 (Composition B) in the catalytic action at lower temperatures than 200° C.

EXAMPLE 3

The same procedure as shown in Example 2 was repeated except that Sample No. 1 was heated at temperatures of 120° C, 300° C and 500° C, respectively, for 4 hours to obtain Sample Nos. 21, 22 and 23.

Figure 3:
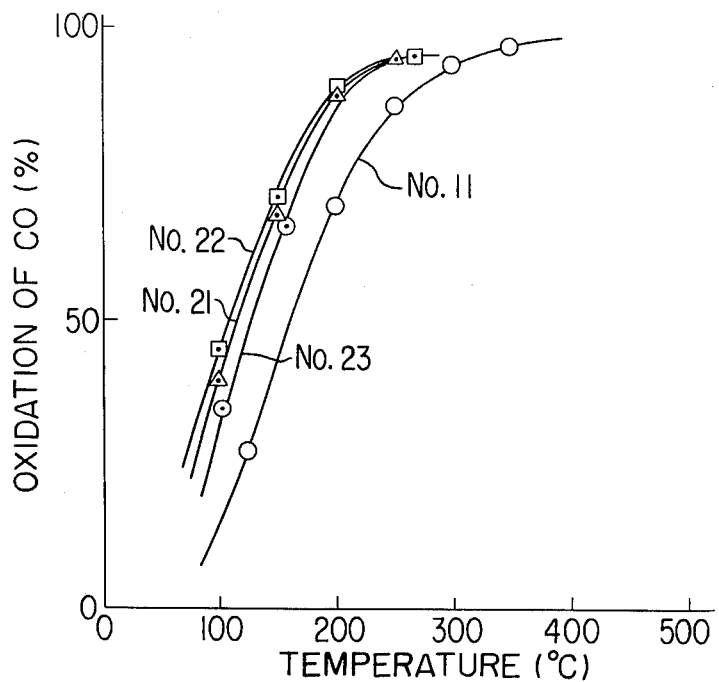

Percentages of oxidation of carbon monoxide of Sample Nos. 21, 22 and 23 were measured in the same manner as that shown in Example 1. The results are shown in FIG. 3. As seen from the results, the catalysts of the present invention are excellent in the catalytic action of oxidation of carbon monoxide also when they have been heated previously at temperatures of 120° C, 300° C and 500° C. Curve No. 11 of FIG. 3 is the same as Curve No. 11 of FIG. 2.

EXAMPLE 4

Sample Nos. 31–36 were provided, which comprise various weight percentages of the ingredients as shown in Table 3, by repeating the same procedure as that of Example 1.

Table 3

| Ingredient (%) | Sample No. | | | | | |
|---|---|---|---|---|---|---|
| | 31 | 32 | 33 | 34 | 35 | 36 |
| γ-MnO$_2$ | 75 | 73 | 70 | 65 | 60 | 55 |
| Calcium aluminate | 20 | 20 | 20 | 20 | 20 | 20 |
| Iron oxyhydroxide | — | 2 | 5 | 10 | 15 | 20 |
| Copper hydroxycarbonate | 5 | 5 | 5 | 5 | 5 | 5 |

As shown above, iron oxyhydroxide is contained in an amount of from zero % to 20%.

Figure 4:
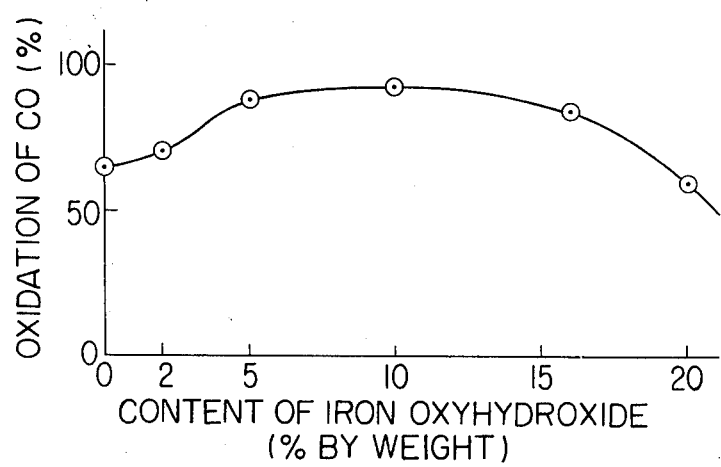

Percentages of oxidation of carbon monoxide were measured at a temperature of 300° C in the same manner as that of Example 1, and the results obtained are shown in FIG. 4. From the results, it is evident that catalysts containing iron oxyhydroxide of 5 to 15% are excellent in the catalytic action of oxidation of carbon monoxide.

EXAMPLE 5

Sample Nos. 41–48 were provided, which comprise various weight percentages of the ingredients as shown in Table 4, by repeating the same procedure as that of Example 2 except that the shaped bodies were heated at a temperature of 500° C, instead of 800° C, for 4 hours.

Table 4

| Ingredient (%) | Sample No. | | | | | | | |
|---|---|---|---|---|---|---|---|---|
| | 41 | 42 | 43 | 44 | 45 | 46 | 47 | 48 |
| γ-MnO$_2$ | 70 | 69 | 68 | 67 | 65 | 60 | 55 | 50 |
| Calcium aluminate | 20 | 20 | 20 | 20 | 20 | 20 | 20 | 20 |
| Iron oxyhydroxide | 10 | 10 | 10 | 10 | 10 | 10 | 10 | 10 |
| Copper hydroxycarbonate | — | 1 | 2 | 3 | 5 | 10 | 15 | 20 |

As shown above, copper hydroxycarbonate is contained in an amount of from zero % to 20%.

Figure 5:
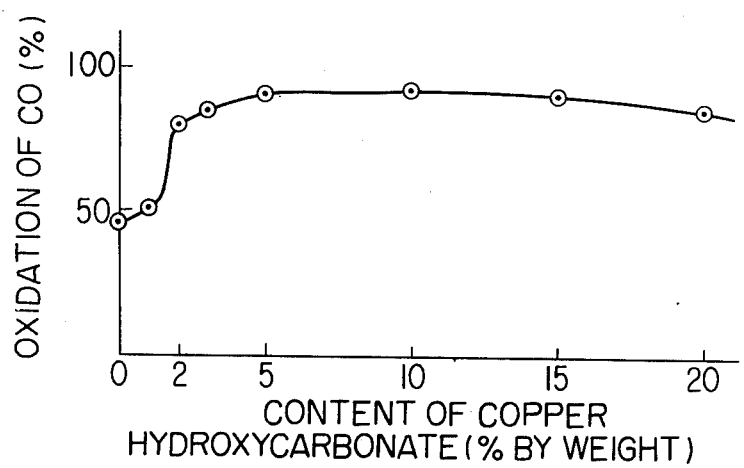

Percentages of oxidation of carbon monoxide were measured at a temperature of 200° C, and the results obtained are shown in FIG. 5. From the results obtained, it is evident that catalysts containing copper hydroxycarbonate of 2 to 10% are excellent in the catalytic action of oxidation of carbon monoxide.

EXAMPLE 6

Figure 6:
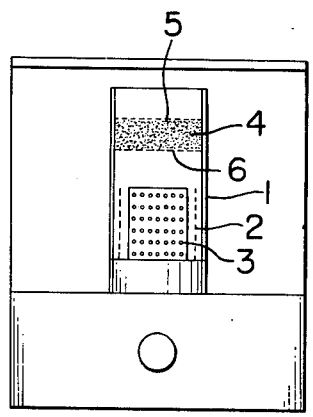

In this example, removal of SO$_2$ by the catalyst of the present invention is illustrated. In FIG. 6, a front view of a home oil heater is shown.

An oil (refined kerosene) is burned in the cylinder of heat resisting glass 1 having a inside diameter of 165 mm, in which the wire netting 2 and the metallic cylinder 3 are equipped with. A waste gas rises and passes through the layer of catalyst 4 which is held between two metallic screens 5 and 6, said screens being of 10 meshes. The layer of catalyst 4 consists of 127 pieces of Sample No. 11 in Example 2. The space velocity of the waste gas was about 10,000 hr$^{-1}$.

Figure 7:
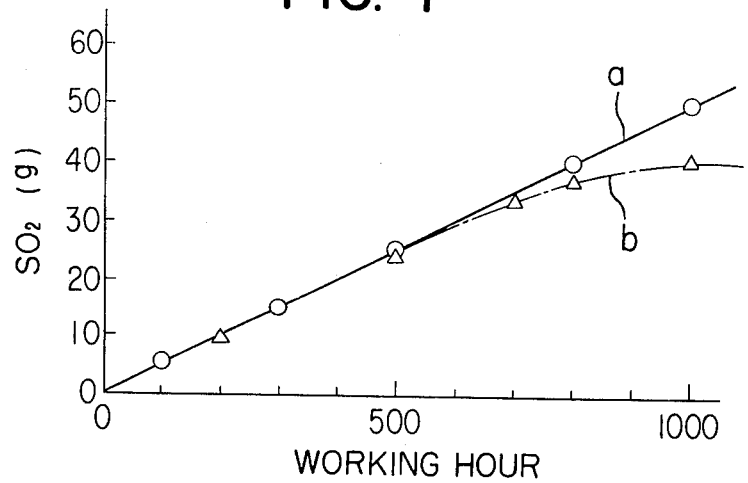

In FIG. 7 Curve $a$ shows an amount of SO$_2$ which has been produced in the oil heater and Curve $b$ shows an amount of SO$_2$ which has been removed by the catalyst. As shown by the curves, SO$_2$ can completely be removed by the catalyst over 600 hours after the start of using the catalyst.

In this catalytic action, SO$_2$ contained in an exhaust gas first is oxidized to SO$_3$ and then SO$_3$ is changed to MnSO$_4$ and CaSO$_4$ by the interaction with MnO$X$ ($x =$ 1 or 2) and CaO in the catalyst.

EXAMPLE 7

A home oil heater as shown in FIG. 6 was worked in a room of 2 m$^3$. Fifteen minutes after the start, the content of CO in the room reached 40 ppm. On the contrary, the content of CO reached over 400 ppm in an oil heater not provided with the catalyst.

EXAMPLE 8

In this example, oxidation of NO is illustrated.

Sample No. 51 was prepared by repeating the same procedure as that of Example 2 except that cobalt hydroxycarbonate was used instead of copper hydroxycarbonate of Sample No. 1.

Oxidations of NO by using Samples No. 1, No. 51 and granular platinum (Pt) catalyst were compared in the same manner as that of Example 1 by using nitrogen gas containing 3% of oxygen and 1,000 ppm of NO at a space velocity of 8,000 hr$^{-1}$.

Figure 8:
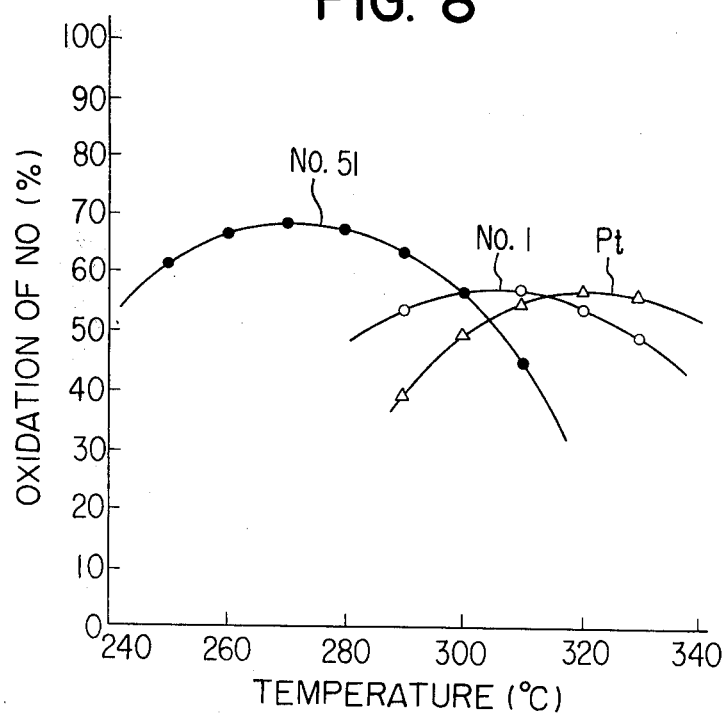

The results obtained are shown in FIG. 8. As seen from the results, excellent catalyst for oxidation of NO at lower temperatures can be obtained by adding cobalt hydroxycarbonate in an amount up to 10% to the catalysts of the present invention.

Oxides of cobalt, copper, vanadium and silver also may be added to the catalysts of the present invention.

EXAMPLE 9

Mechanical strength of the catalysts of the present invention may be improved by adding reinforcing fillers to the catalysts.

Silica, asbestos, ceramic fibers (i.e. dealkalizated glass fiber) and metallic wire (i.e. iron or copper wire having a size of 0.5 mm$\phi$ × 30 mm) may be used as the reinforcing fillers.

Test pieces of the catalysts were prepared as follows:

Ingredients and reinforcing filler as shown in the following Table 5 were mixed with a small amount of water, and the mixtures were molded at a pressure of 0.5 ton/cm$^2$ to obtain shaped bodies having a size of 40 × 20 × 5 mm. Bending strength of the test pieces were measured at a room temperature and after heating at a temperature of 500° C for 4 hours. The results obtained are shown in Table 5.

Table 5

| Ingredient reinforcing filler (parts by weight) | | Test piece No. | | | | |
|---|---|---|---|---|---|---|
| | | 61 | 62 | 63 | 64 | 65 |
| γ-MnO$_2$ | | 65 | 65 | 65 | 65 | 65 |
| Calcium aluminate | | 20 | 20 | 20 | 20 | 20 |
| Iron oxyhydroxide | | 10 | 10 | 10 | 10 | 10 |
| Copper hydroxycarbonate | | 5 | 5 | 5 | 5 | 5 |
| Reinforcing filler | | — | silica 10 | Asbestos 5 | Glass fiber 2 | Iron wire 5 |
| Bending strength (kg/cm$^2$) | Room temperature | 290 | 310 | 340 | 340 | 370 |
| | After heating at 500° C | 250 | 260 | 290 | 300 | 320 |

As seen from the results, mechanical strength of the catalyst can be improved by adding reinforcing fillers to the catalysts.

We claim:

1. A catalyst comprising a mixture of from 45 to 75% by weight of manganese dioxide, from 15 to 25% by weight of calcium aluminate, from 5 to 15% by weight of iron oxyhydroxide and from 2 to 10% by weight of copper hydroxycarbonate.

2. A catalyst prepared by heating a mixture of from 45 to 75% by weight of manganese dioxide, from 15 to 25% by weight of calcium aluminate, from 5 to 15% by weight of iron oxyhydroxide and from 2 to 10% by weight of copper hydroxycarbonate at a temperature between 220° C and 850° C for 1 to 5 hours.

3. A process for preparing a catalyst which comprises:
   a. adding water to a mixture of from 45 to 75% by weight of manganese dioxide, from 15 to 25% by weight of calcium aluminate, from 5 to 15% by weight of iron oxyhydroxide and from 2 to 10% by weight of copper hydroxycarbonate,
   b. forming the mixture into the desired shape, and
   c. accomplishing the curing of the shaped body in the presence of water to solidify the shaped body.

4. A process of preparing a catalyst which comprises:
   a. adding water to a mixture of from 45 to 75% by weight of manganese dioxide, from 15 to 25% by weight of calcium aluminate, from 5 to 15% by weight of iron oxyhydroxide and from 2 to 10% by weight of copper hydroxycarbonate,
   b. forming the mixture into the desired shape,
   c. accomplishing the curing of the shaped body in the presence of water to solidify the shaped body, and
   d. heating the solidified body at a temperture between 220° C and 850° C for 1 to 5 hours.

5. Process according to claim 3 wherein the curing is accomplished in steam at a temperature between 65° C and 95° C.

6. A catalyst according to claim 1 wherein reinforcing fillers are contained in the catalysts.

7. A catalyst according to claim 6 wherein the reinforcing fillers are selected from the group consisting of silicon dioxide, asbestos, glass fiber and metallic wire.

8. The process according to claim 4 wherein the curing is accomplished in steam at a temperature between 65° C and 95° C.

9. The process according to claim 3 wherein the formed mixture is cured in air before being cured in the presence of water.

10. The process according to claim 4 wherein the formed mixture is cured in air before being cured in the presence of water.

11. A catalyst according to claim 2 wherein reinforcing fillers are contained in the catalyst.

12. A catalyst according to claim 11 wherein the reinforcing fillers are selected from the group consisting of silicon dioxide, asbestos, glass fiber and metallic wire.

13. The process according to claim 5 wherein the formed mixture is cured in air before being cured in steam.

14. The process according to claim 8 wherein the formed mixture is cured in air before being cured in steam.

* * * * *

UNITED STATES PATENT OFFICE
CERTIFICATE OF CORRECTION

Patent No. 4,065,406     Dated December 27, 1977

Inventor(s) Atsushi Nishino, et al

It is certified that error appears in the above-identified patent and that said Letters Patent are hereby corrected as shown below:

Column 2, line 10: "220° 1 C" should be --220° C--.

line 16: "$\phi$-$Fe_2O_3$" should be -- $\gamma$-$Fe_2O_3$ --.

Signed and Sealed this

Thirteenth Day of June 1978

[SEAL]

Attest:

RUTH C. MASON
*Attesting Officer*

DONALD W. BANNER
*Commissioner of Patents and Trademarks*